April 16, 1968

R. W. MADISON 3,378,107

ELEVATOR CONTROL WITH PREDETERMINED NUMBER OF
ZONES, PREDETERMINED NUMBER OF FLOORS PER
ZONE, AND PREDETERMINED NUMBER OF CARS
ASSIGNED TO EACH ZONE

Filed March 19, 1964

ROBERT WAYNE MADISON INVENTOR

BY *[signature]* ATTORNEY

ROBERT WAYNE MADISON INVENTOR

BY *J. L. Sharon* ATTORNEY

April 16, 1968  R. W. MADISON  3,378,107
ELEVATOR CONTROL WITH PREDETERMINED NUMBER OF
ZONES, PREDETERMINED NUMBER OF FLOORS PER
ZONE, AND PREDETERMINED NUMBER OF CARS
ASSIGNED TO EACH ZONE
Filed March 19, 1964  6 Sheets-Sheet 4

FIG. 6

ROBERT WAYNE MADISON INVENTOR

BY J. S. Sharon ATTORNEY

April 16, 1968 R. W. MADISON 3,378,107
ELEVATOR CONTROL WITH PREDETERMINED NUMBER OF
ZONES, PREDETERMINED NUMBER OF FLOORS PER
ZONE, AND PREDETERMINED NUMBER OF CARS
ASSIGNED TO EACH ZONE
Filed March 19, 1964 6 Sheets-Sheet 5

Fig. 8

ROBERT WAYNE MADISON INVENTOR

BY */s/* ATTORNEY

FIG. 9

United States Patent Office 3,378,107
Patented Apr. 16, 1968

3,378,107
ELEVATOR CONTROL WITH PREDETERMINED NUMBER OF ZONES, PREDETERMINED NUMBER OF FLOORS PER ZONE, AND PREDETERMINED NUMBER OF CARS ASSIGNED TO EACH ZONE
Robert Wayne Madison, Old Bethpage, N.Y., assignor to Otis Elevator Company, New York, N.Y., a corporation of New Jersey
Filed Mar. 19, 1964, Ser. No. 353,116
22 Claims. (Cl. 187—29)

ABSTRACT OF THE DISCLOSURE

A control system, for a plurality of elevator cars, which operates to divide the building it occupies into a predetermined number of zones each containing a predetermined number of landings. Each of the zones is assigned the services of one of the cars if it is present in the zone. Unless responding to calls, a car which is not assigned to the zone it is in is forced to travel until it is ultimately located in a zone to which it becomes assigned. An assigned car operates in response to only those landing calls in its zone or in contiguous empty zones above and adjoining its zone. When the main landing zone is empty a car in the nearest occupied zone above it is caused to travel down into the main landing zone either immediately upon the registration of a call therein or, if no such call is registered, a predetermined period after the zone becomes empty.

---

This invention relates to elevators and particularly to automatic control systems for elevators.

The invention is directed to plural car elevator systems in which the starting and stopping of the cars under certain conditions is in response to the calls that are registered. Such systems effect the starting of one car in response to the registration of the first call in the system and bring one or more additional cars into operation as certain service demand conditions arise. Heretofore, under certain traffic conditions, these systems frequently caused the operation of less than a sufficient number of cars to provide fast and efficient service.

It is, therefore, an object of this invention to provide a system for rendering increased efficiency of elevator service under certain traffic conditions.

In a preferred embodiment of the invention the cars are changeably assigned to the various zones of a building. These zones preferably consist of a main landing zone, which includes the building lobby landing and any basement and sub-basement landings; and one or more upper zones between which are divided the upper landings. Each zone is assigned the services of one or more of the cars which respond to the traffic demands arising in the zone to the exclusion of the remaining cars of the system. In addition, each car serves any landing of the building in response to calls registered on its car call registering circuits. While the assigned car or cars operate within the assigned zone no other car can enter the zone in response to a landing call that is registered in that zone; it may, however, enter the zone in response to its own car calls. Conversely, when an assigned car leaves its zone in response to a car call, a different car which is temporarily unassigned may enter the zone and become assigned thereto. If necessary, an assigned but idle car may leave its assigned zone to respond to landing calls in a temporarily unoccupied adjacent zone.

A more complete understanding of the preferred mode of carrying out the invention and various features and advantages thereof will be gained from the following description and appended claims when considered in conjunction with the drawing, in which:

To facilitate an understanding of an application of the invention, the illustrated control system has been considerably simplified from that which would be used in a complete commercial installation. It is to be understood that in applying the invention to various types of control systems, many changes may be made, especially in adapting it to the more complex arrangements, without departing from its intent and principles of operation.

The electromagnetic switches employed in the system illustrated are designated as follows:

ADV—Advanced advancer switch
ASR—Automatic starting switch
BLZ—Bottom landing zone switch
BR—Brake release switch
C—Potential switch
CBS—Car button switch
CC—Continuous call switch
CPR—Call pickup relay
D—Down direction switch
DG—Direction holding switch
DGD—Auxiliary down direction switch
DGU—Auxiliary up direction switch
DO—Door open switch
1E—First speed switch
2E—Second speed switch
ETS—Excitation time switch
FLC—False call switch
GH—Door close limit switch
GUD—Group up dispatching switch
H—Field and brake switch
HCR—Hall call relay
HG—Higher car call switch
HJ—Higher call switch
HJX—Higher hall call switch
HS—Hall stop switch
HR—Highest call reversal switch
HRX—Auxiliary highest call reversal switch
LG—Lower car call switch
LJ—Lower call switch
LJX—Lower hall call switch
LR—Lowest call reversal switch
MGP—MG set preference switch
MGT—MG set time relay
MGZ—Group middle zone relay
MLGZ—Group main landing zone relay
MLU—Main landing up switch
MLZ—Main landing zone switch
MZ—Middle zone switch
NT—Door hold open switch
PM—Pawl magnet (on selector)
PMY—Pawl magnet relay RUN—Running relay
SC—Selection switch
TGZ—Group top zone relay
TLZ—Zone top landing switch
TZ—Top zone switch
U—Up direction switch
XDO—MG start and door open switch Throughout the description which follows, these letters will be applied to the above designated relays and switches; and, with reference numerals appended thereto, will be applied to their contacts. The circuits for the coils of all switches which have group functions have been shown. For purposes of simplification the circuits for the coils of relays and switches which perform functions peculiar to only one of the elevators of the group have been shown. Throughout the description where deemed necessary differentiation will be made between the components of the various elevators by appending to the reference characters lower case letters $a$, $b$ and $c$, indicative of the different elevators.

Figure 7:
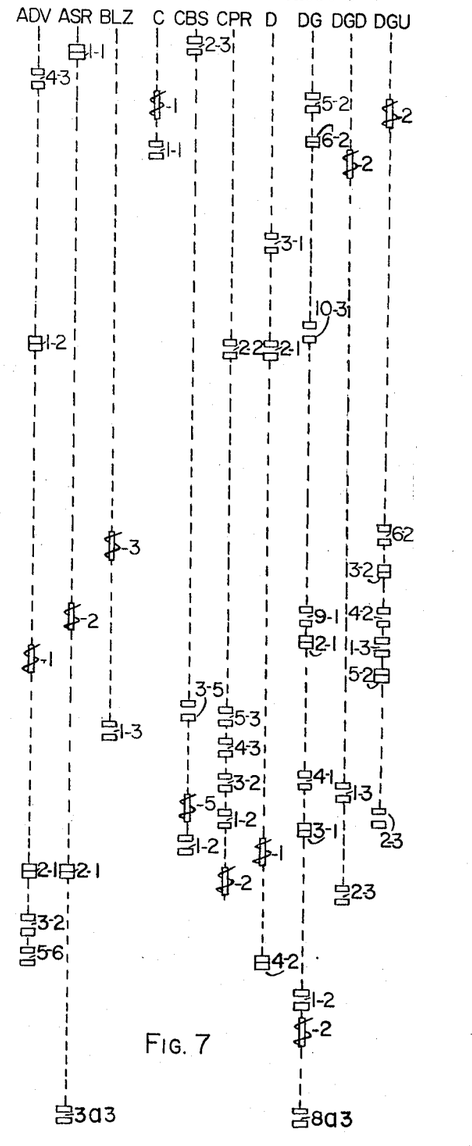
FIGURES 7, 8 and 9 constitute "spindle sheet" diagrams which show the relationships between the coils and contacts when placed in vertical correspondence with the drawing figures.
Figure 8:
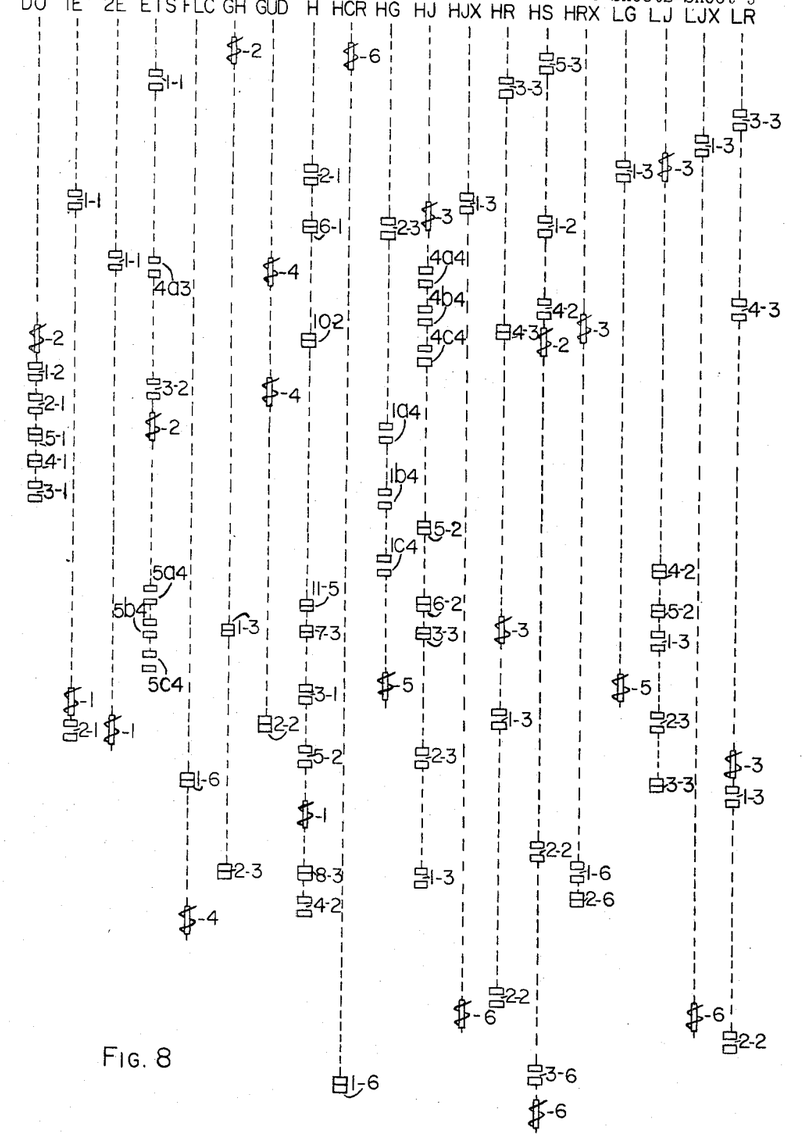
Figure 9:
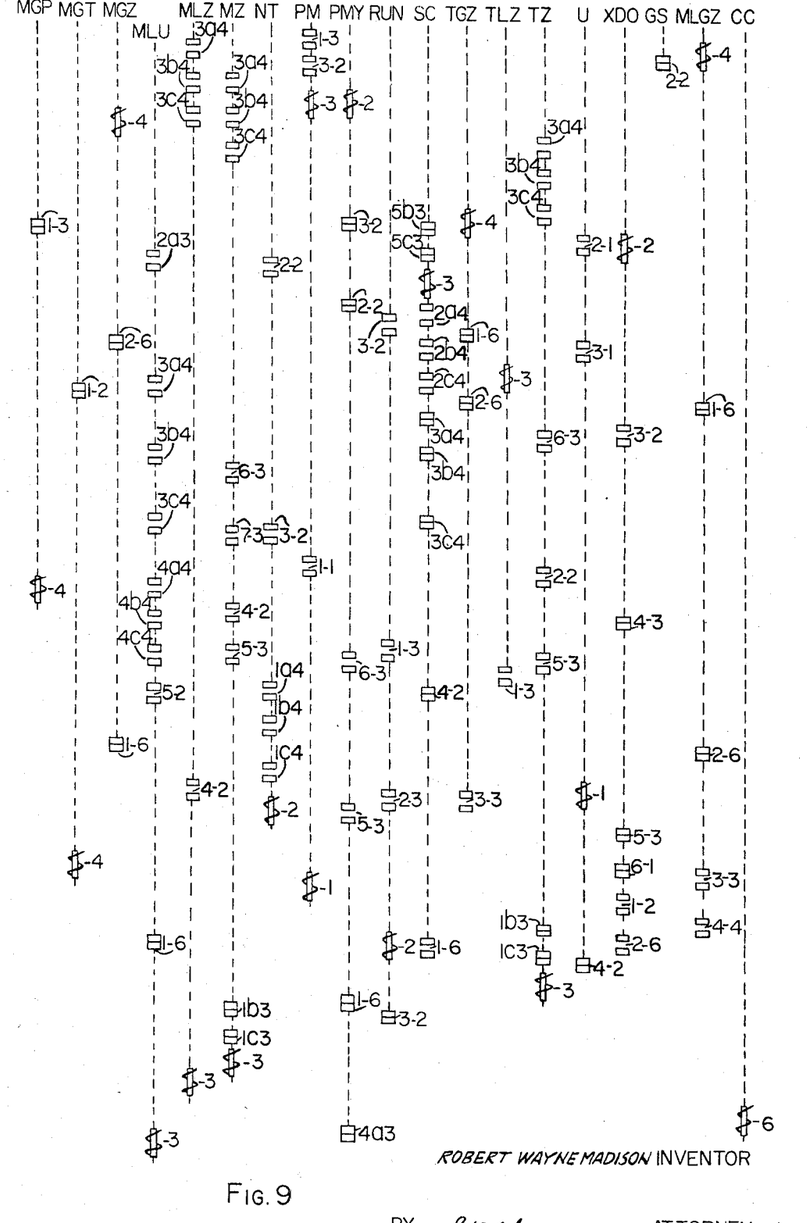

The circuits in the drawing are presented in a simplified form wherein the coils and contacts of the relays and switches are disassociated from one another and are grouped in series and series parallel circuits extending between positive and negative potential leads. The relationship between the coils and their associated contacts is indicated on the "spindle sheet" FIGURES 7 to 9. The switches are there arranged in alphabetical order of their reference designation and to each coil and contact a numerical reference is applied. Each contact has a pair of hyphened references, the first of which indicates the number of the contact and the second indicates the drawing figure in which it is located. In the case of the coil, only a single reference indicating the drawing figure is displayed. Thus, a specific coil or contact can readily be located by aligning its "spindle sheet" figure in vertical correspondence with the drawing figure indicated for the element in question.

The electromagnetic switches are illustrated in de-energized condition. Switch DG is of the latching type and has an operating coil and a reset coil. Its contacts are shown for its reset condition. Switch HS has an operating coil and a holding coil. Switch GUD has two operating coils.

Figure 1:
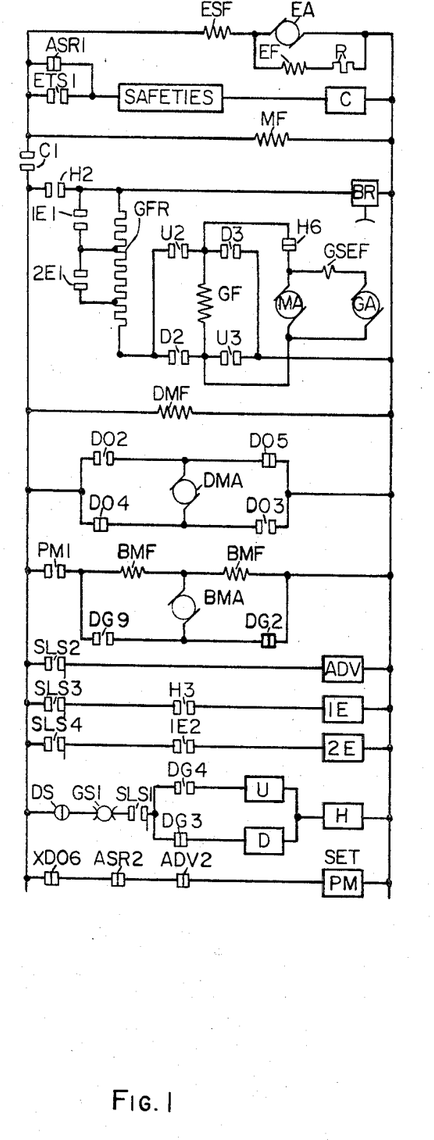
FIGURE 1 is a simplified schematic wiring diagram of power and control circuits for one elevator, these circuits being identical for all of the elevators.

Referring now to the drawing, there is shown in FIGURE 1, an exciter having series and shunt fields ESF and EF, respectively, and armature EA which forms a part of the usual motor-generator set and is connected to supply current to the various elevator control circuits. The generator of this set has its shunt field GF connected to the exciter armature through conventional direction controlling circuits and has its series field GSEF in the armature loop circuit. The elevator drive motor shunt field MF is connected across the exciter armature output terminals, as is brake release coil BR which is subject to contacts H2. Door motor armature DMA and its field DMF are connected through switching contacts to the exciter armature outputs to be energized for elevator door operation. A brush advancer motor has its armature BMA and field BMF connected through switching contacts to the exciter armature output terminals for the purpose of controlling the operation of selector switches SLS1, SLS2, SLS3 and SLS4 through the positioning of the selector advancer panel, which panel is not shown herein. Various control switches and the circuits therefor are also shown.

Figure 2:
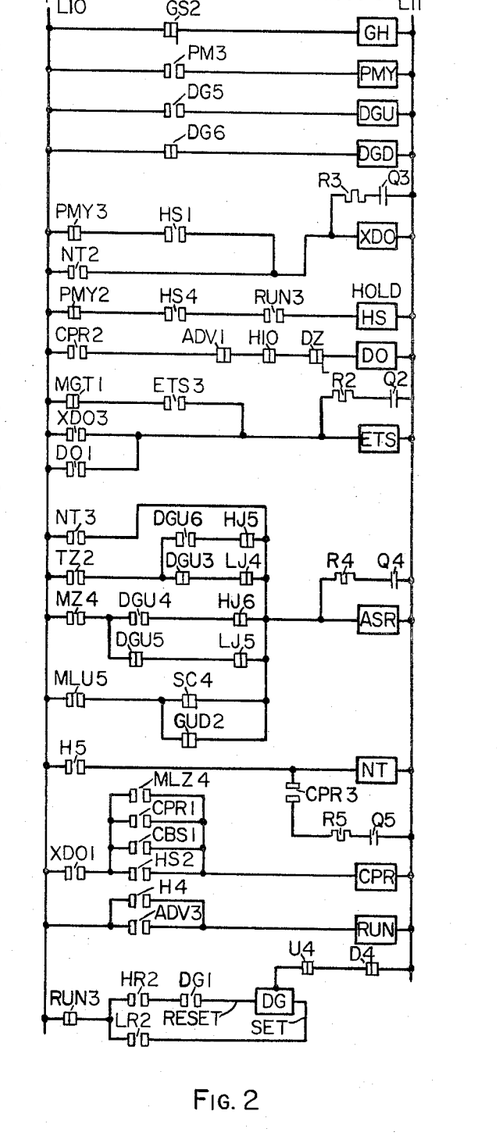
FIGURES 2, 3 and 4 taken together constitute a simplified schematic wiring diagram of the operating circuits for one of the elevators, certain circuits being common to all the elevators.

FIGURE 2 indicates the circuit connections for various control circuits having to do with starting and stopping the car, and are individual to each car.

Figure 3:
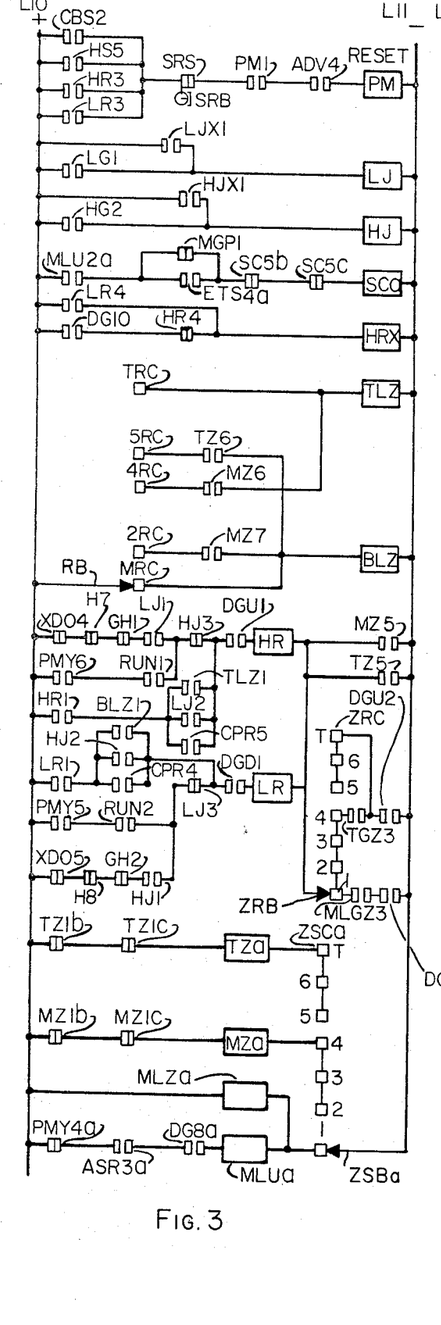

FIGURE 3 relates to the arrangement for determining control in response to the location of the call or calls with regard to the location of a car and with regard to the position of companion cars in the various zones. It is to be understood that the zoning brushes RB, ZRB and ZSB for each car are located on the selector advancer panel for their respective car. Also, brushes ZRB and ZSB are so constructed as to engage the next succeeding contact in the direction of travel before disengaging from the preceding stationary contact. When a car is stopped at a floor, all brushes on the selector are in engagement with their cooperating stationary contacts for that floor. The brushes on the advancer panel, however, precede the synchronous indication of the car's location and, among other functions, latch by a pawl mechanism into engagement with the contacts for a floor where a stop is to be made and are maintained in that position as the car moves into registry with the landing.

Figure 4:
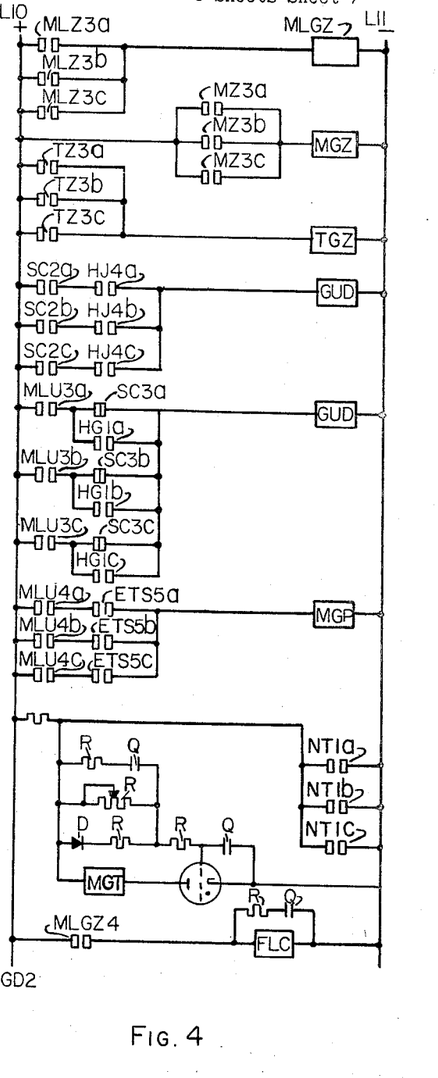

FIGURE 4 indicates circuit details for the group dispatching and zoning arrangements.

Figure 5:
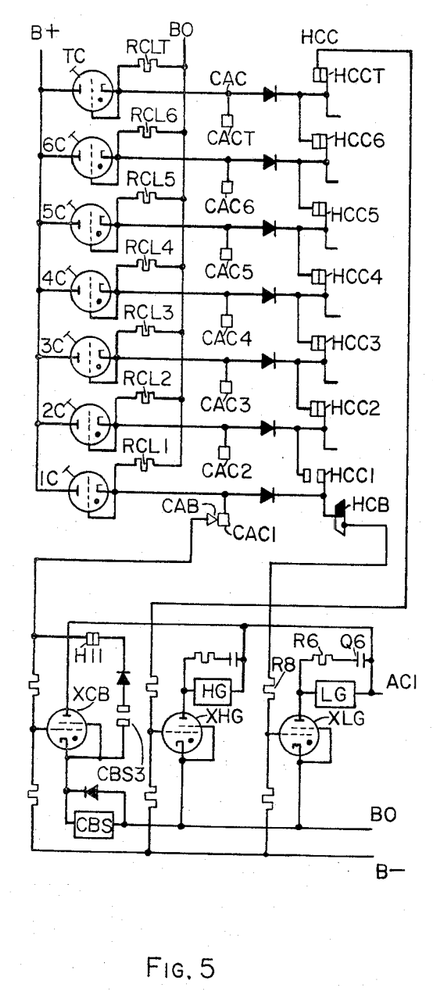
FIGURE 5 is a simplified schematic wiring diagram of the car call circuits for one of the elevators.

FIGURE 5, showing the arrangement of the car call registering circuits, the call pickup and cancelling circuits and the circuits for indicating car calls as being either above or below the location of the car, is somewhat similar to the arrangement of FIGURE 6 with which it will be considered. The hall call pickup and cancelling brushes DHB and UHB, the car call pickup and cancelling brush CAB and the highest and lowest hall call brushes HHB and LHB are each physically located on the advancer panel. The highest and lowest car call brush HCB (FIG. 5) is similarly located on that panel and in conjunction with the thyratron gas tubes XLG and XHG operates to indicate the presence or absence of car calls below or above the effective (not synchronous) location of the car.

Figure 6:
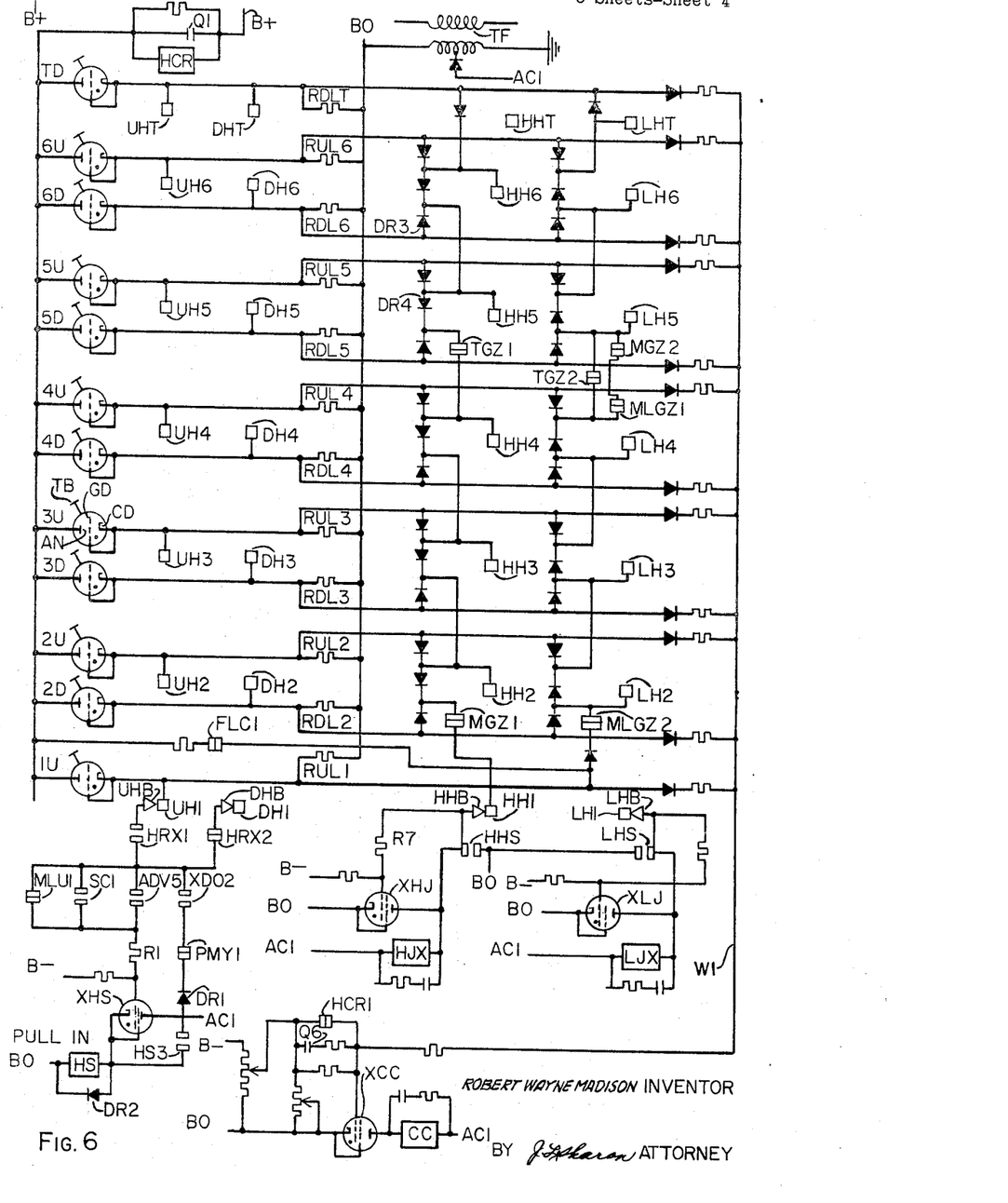
FIGURE 6 is a simplified schematic wiring diagram of the hall call circuits for one of the elevators, certain circuits being common to all elevators.

In both FIGURES 5 and 6 the car and hall calls are registered on cold cathode gas tubes (1U, 2D, or 1C) which have a numerical designation indicating the landing with which they are associated and a letter suffix indicating direction of travel or their location in the car. These are actuated through the capacity-to-ground coupling of a person that touches their exterior electrode which also functions as the touch button TB (3U, FIG. 6). Each tube has a load resistor (RUL, RDL or RCL) in its anode circuit across which a signal potential appears as the tube conducts current in response to the registration of a call. This potential appears on selector contacts CAC and HCC for car calls and contacts UH, DH, HH and LH in the case of landing calls. As is well known, voltage values of 135 volts from line B+ to line $B_o$, 150 volts R.M.S. from line $B_o$ to the ground potential end of the secondary winding of transformer TF, 95 volts R.M.S. from line $B_o$ to line AC1 and minus 45 volts from line B− to line $B_o$ may suitably be used in conjunction with the cold cathode gas tubes.

Coil HCR (FIG. 6) of the hall call relay is in series connection with the plate supply of the landing touch button or cold cathode tubes and is adjusted to "pull in" or operate when a predetermined amperage, corresponding in magnitude to the combined currents in a predetermined number of conducting tubes, passes through the coil. Accordingly, the relay operates as a detector when this minimum number of landing calls, irrespective of their direction, exists. Capacitor Q1 acts as a filter for short sharp induced current surges. Capacitor Q6 and thyratron tube XCC act as time measuring elements and serve to actuate continuous call switch CC when the predetermined number of registered landing calls have existed continuously for a predetermined time. This measurement is useful for indicating the presence of traffic demands in excess of those for which the invention of this system is optimum, and the agency of switch CC provides a ready means for switching over to a system of operation more especially styled for the changed circumstance.

Before considering the manner in which the movements of the cars of this system control and influence each other, it may be helpful to describe briefly the operation of this control system in starting and stopping a single car. Thus, in the later description of the manner in which the various zones are provided the desired services, it will not be necessary to repeat these operations for each car.

Assume for purpose of explanation that car *a* is standing at the sixth landing with the car and landing doors closed, its motor-generator operating and its direction holding switch DG in its reset condition for future down travel. Under these conditions its exciter armature EA (FIG. 1) is rotating and the potential switch C is energized by the exciter current. The hoisting motor field MF and door motor field DMF are energized. Door limit contacts GS2 (FIG. 2) are closed and the coil GH of the door close limit switch is energized, thus separating contacts GH1 and GH2 (FIG. 3) in the circuit of coils HR and LR of the highest and the lowest call reversal switches. Coil DGD of the auxiliary down direction switch is energized. Coil ETS of the excitation time switch is energized over the circuit including contacts MGT1 and self-holding contacts ETS3. Coil TZ*a* is energized through contacts TZ1*b*, TZ1*c*, ZSC6*a* and brush ZSB*a* to close its contacts TZ2 (FIG. 2), in circuit with contacts DGU3 and LJ4 in the circuit of coil ASR of the automatic starting switch. Also, coil TGZ (FIG. 4) of the group top zone relay is energized through contacts TZ3*a* to separate its zoning contacts TGZ1 (FIG. 6) and TGZ2 in the highest and lowest hall call circuits.

Assume a down hall call is now registered at the sixth landing by an intending passenger touching the hall button connected to tube 6D causing the tube to conduct current between its anode and cathode. This causes a potential to appear at the DH6 selector contacts with which brush DHB*a* has contact. Thyratron tube XHS*a* conducts when the potential on contacts DH6*a* is applied to its control grid. The circuit connection to the control grid is through brush DHB*a*, contacts HRX2*a*, contacts MLU1*a* and resistor R1. Tube XHS*a* conducting causes energization of the pull-in coil HS*a* of the hall stop switch in its cathode circuit, closing contacts HS1*a*, HS2*a*, HS3*a*, HS4*a* and HS5*a*. Contacts HS1*a* (FIG. 2) engage to complete the circuit for coil XDO*a* of the start and door open switch, the circuit being line B+ through contacts PMY3*a* and HS1*a*. Contacts HS2*a* close to prepare a circuit for coil CPR*a* of the call pickup relay which will be energized when contacts XDO1*a* engage. Contacts HS3*a* engage to prepare a circuit for extinguishing the tube 6D when contacts XDO2*a* close. Contacts HS4*a* and HS5*a* close without effect at this time. The energization of coil XDO*a* causes contacts XDO1*a*, XDO2*a*, XDO3*a* to close and contacts XDO4*a*, XDO5*a* and XDO6*a* to separate. Contacts XDO4*a*, XDO5*a* and XDO6*a* open without effect at this time. Contacts XDO1*a* close completing the circuit for the coil CPR*a* of the call pickup relay through contacts XDO1*a* and previously closed contacts HS2*a*. Contacts XDO2*a* engage to complete the extinguishing circuit for tube 6D. Contacts XDO3*a* close in the circuit of previously energized coil ETS*a*. The energization of coil CPR*a* causes closing of contacts CPR1*a*, CPR2*a*, CPR3*a*, CPR4*a*, and CPR5*a*, the last three of which are without effect at this time. Contacts CPR1*a* provide a holding circuit for the coil and contacts CPR2*a* engage to complete the circuit for the energization of coil DO*a* of the door open switch through contacts CPR2*a*, ADV1*a*, H1*a* and the selector door zone contact DZ*a*. This switch closes its contacts DO2, DO3 and separates contacts DO4, DO5 to energize the door operating motor for opening movement. As the doors complete their opening movement, limit contacts GS2 open in the circuit of coil GH (FIG. 2) of the door close limit switch, and the intending passenger enters the car.

Contacts XDO2 complete the extinguishing circuit for tube 6D (FIG. 6) by applying the cathode potential of tube XHS*a* through contacts HS3*a*, rectifier DR1, contacts PMY1*a*, XDO2*a* and HRX2*a*, advancer panel brush DHB*a* and selector contact DH6*a* to the cathode of tube 6D. This reduces the potential drop across the anode-cathode circuit to less than is required for sustained conduction. When tube 6D is extinguished the potential across resistor RDL6 causes to exist and tube XHS*a* is caused to extinguish upon the beginning of the next negative half cycle of the A.C. potential supply to its plate. This interrupts the energizing current for the pull-in coil HS*a* of the hall stop switch and the switch drops out after the induced current flowing through the coil and rectifier DR2 drops below a value sufficient to hold the switch in its operated condition.

Assume the entering passenger touches the car button connected to the tube 1C*a* (FIG. 5) to register a lobby car call, and complete a circuit to selector floor bar contact CAC1*a* and through the series connected HCC hook switches to cam HCB*a* and the control grid of thyratron tube XLG*a* conducts during the positive half-cycles of alternating potential and the coil LG*a* of lower car call switch LG*a* in the plate circuit of the tube is energized; closing its contacts LG1*a*. Closed contacts LG1*a* complete a circuit to coil LJ*a* of lower call switch LJ*a* to close contacts LJ1*a* and LJ2*a* in the circuits of coil HR*a* of highest call reversal switch HR*a* without effect at this time. Contacts LJ3*a* are separated in the circuit of coil LR*a* and contacts LJ4*a* separate in the circuit of coil ASR*a* of automatic starting switch ASR*a* to start the dropping out of the switch as the charge on condenser Q4 dissipates through resistor R4 and the coil. Contacts LJ5*a* separate without effect at this time.

During this time the current induced by the induction of coil HS*a* of hall stop switch HS*a* drops below the hold-in value and the switch releases. This opens contacts HS1*a* in the circuit of coil XDO*a* and the switch releases when the charge on condenser Q3 is dissipated. Contacts XDO3*a* open without effect since still closed contacts DO1*a* are in parallel with them. Contacts XDO2*a* also open without effect at this time. Contacts XDO1*a* open interrupting the circuit for the coil of CPR*a* the call pickup relay. This causes contacts CPR2*a* to disengage in the circuit of coil DO*a* of the door open switch and contacts DO2*a* and DO3*a* disengage and contacts DO4*a* and DO5*a* engage to energize door motor armature DMA in a direction to close the car and landing doors.

When condenser Q4 discharges to a point where the current through coil ASR*a* is less than its hold-in value contacts ASR1*a* and ASR3*a* open (without effect at this time) and contacts ASR2*a* engage to complete the circuit for the set coil of the selector pawl magnet PM*a* through contacts XDO6*a*, ASR2*a* and ADV2*a* to energize said coil and lift the pawl magnet. This results in the engagement of contacts PM1*a*, PM2*a* and PM3*a* and the excitation of brush motor fields BMF and armature BMA through the circuit including closed contacts PM1*a* and DG2*a* to cause the brush motor to move the advancer panel the proper distance ahead of the synchronous or crosshead panel. Contacts PM2*a* close without effect at this time. Contacts PM3*a* close to energize the coil PMY*a* of the pawl magnet relay causing the relay to operate and to close its contacts PMY5*a* and PMY6*a* and open its contacts PMY1*a*, PMY2*a*, PMY3*a* and PMY4*a* all without effect at this time. The downward movement of the advancer panel closes contacts SLS1*a*, SLS2*a*, SLS3*a*, and SLS4*a* in that order. SLS2*a* as it closes completes the circuit for the coil ADV*a* of the advanced advancer switch. Contacts SLS1*a*, SLS3*a* and SLS4*a* close in the direction-and-speed switch coil circuits to prepare such circuits for later energization.

When the advanced advancer switch ADV*a* operates it closes its contacts ADV3*a*, ADV4*a* and ADV5*a* and opens its contacts ADV1*a* and ADV2*a*. Contacts ADV3*a* complete the circuit for coil RUN*a* of the running relay thereby closing contacts RUN1*a*, RUN2*a* and RUN3*a* without effect at this time.

When the gate contacts GS1 and the door interlock contacts DS close and contacts SLS1*a* engage, the coils D*a* and H*a* of the down direction switch and the field and brake switch are energized through contacts DG3*a*. Contacts D2a, D3a and H2a close to supply current through resistor GFR for excitation of generator shunt field GF. At the same time contacts H2a close the circuit to brake coil BRa which upon being energized causes the brake to lift permitting the elevator machine (not shown) to move the car. As the generator shunt field GF is excited the generator armature GA driven by the drive motor of the MG set supplies current to the elevator drive motor armature MA and the elevator drive motor turns in a direction to move the car toward the lobby floor. Contacts H3a close to complete the circuit for coil 1Ea of the first speed switch and close contacts 1E1a and 1E2a. Contacts H4a close in the circuit of energized coil RUNa. Contacts H5a close energizing coil NTa of the door hold open switch. Contacts D4a open to prevent operation of directing holding switch DGa while running. Contacts H6a open disconnecting the generator shunt field GF from the generator armature GA. Contacts H7a, H8a, H10a and T11a open without effect at this time.

When switch 1Ea operates, contacts 1E1a close to short part of resistance GFR, increasing the excitation of the generator shunt field GF; and contacts 1E2a close to complete the circuit for coil 2Ea of the second speed switch. The second speed switch closes contacts 2E1a to short more of GFR resistance fully increasing the excitation of the generator shunt field GF and causing the elevator car to run full speed toward the lobby.

When door hold open switch NTa operated, as previously explained, contacts NT1a closed without effect. Contacts NT2a closed causing energization of coil XDOa of MG start and door open switch, and charging of condenser Q3 through resistor R3. Contacts NT3a closed causing energization of coil ASRa of automatic starting switch, and charging of condenser Q4 through resistor R4.

Assume, that no registered down hall call is encountered as the car proceeds directly to the lobby. As the nonconducting upper portion of advanced panel cam HCBa engages hook switch HCC1a the potential of the cathode of tube 1Ca is removed from the control grid of tube XLGa to extinguish it on the next negative half-cycle of alternating voltage. This causes the lower car call switch LGa to release when the inductive voltage across its coil and dissipating through the coil, resistor R6 and condenser Q6 falls below the hold-in value. Switch LGa separates its contacts LG1a (FIG. 3) which open the circuit to coil LJa of lower call switch and contacts LJ3a close completing the circuit for the energization of the coil LRa of lowest call reversal switch through contacts PMY5a, RUN2a, LJ3a and DGD1a, advancer panel brush ZRBa, selector floor bar contact ZRC1a and contacts MLGZ3 and DGD2a. Contacts LR1a close to prepare a self-holding circuit for relay LRa. Contacts LR2a close preparing the circuit for energizing the set coil DGa of the direction holding switch. Contacts LR3a close completing the circuit for the reset coil PMa of the pawl magnet so as to release the pawl magnet. Contacts LR4a close without effect at this time.

As cam HCBa engages hook switch HCC1a, advancer panel brush RB (FIG. 3) engages stationary contacts MRCa to cause energization of coil BLZa of the zone bottom landing switch BLZa, closing contacts BLZ1a and completing the self-holding circuit for relay LRa. Advancer panel brush CABa (FIG. 5) engages contact CAC1a to complete a circuit for the grid of thyratron tube XCBa and energize the coil CBSa of the car button switch. When switch CBSa operates it closes its contact CBS1a completing the circuit for the coil CPRa of the call pickup relay. In addition advancer panel brush ZSBa (FIG. 3) engages stationary contact ZSC1a causing energization of coil MLZa of the main landing zone switch. This operates its contacts MLZ4 in the circuit of coil CPRa to insure door opening at the main landing whenever a car stops at that landing.

The pawl magnet opens contacts PM3a in the circuit of coil PMYa. It also opens contacts PM1a interrupting the current to the brush motor and stopping the advancer as the pawls come to rest on the lug associated with the first landing. As the synchronous crosshead panel continues downward movement it causes the selector stopping switches SLS4a and SLS3a to open in that order, to decrease the excitation of field GF. This causes the motor to operate at its slowest speed as the car comes into the floor. Further travel of the car brings the crosshead panel into closer alignment with the advancer panel and contacts SLS2a and SLS1a open in the circuits of coils ADVa, Da and Ha to bring the car to a stop.

As contacts H10a and ADV1a close, the coil DOa of door open switch is energized through engaged contacts CPR2a, ADV1a, H10a and DZa to cause the doors to open. The registered car call for the first landing is reset by the engagement of contacts H11a which causes the potential of the cathode of tube XCBa to be applied to the cathode of tube 1Ca through closed contacts CBS3a and H11a. This causes the extinguishment of tubes 1Ca and XCBa and the dropping of switch CBSa in the same manner as tubes 6D and XHSa were extinguished and switch HSa was dropped through the resetting of the sixth floor down hall call.

The opening of contacts H4a deenergizes coil RUNa and engages contacts RUN3a. Closed contacts RUN3a complete the circuit to the set coil DGa of the direction holding switch DGa through contacts LR2a and contacts U4a and D4a to prepare the car for future up travel. Switch DGa opens its contacts DG6a in the circuit of coil DGDa which releases to open contacts DGD1a. This interrupts the self-holding circuit for relay LRa causing it to release.

So far operation of but one car has been described. The operation of the other elevators, in so far as starting the car and responding to calls is concerned, is the same as that of elevator a. Each of the other cars responds to its own car buttons and also answers landing calls, the particular car answering any particular landing call being the first one set for travel in the direction corresponding to the call registered whose call pickup brush for that direction of travel engages its selector contact corresponding to the hall button pressed.

In order to adapt the system of this invention for use with other types of control arrangements, the continuous call switch CC (FIG. 6) has been provided. This switch is in its deenergized condition unless a predetermined number of landing calls, as measured by hall call relay HCR (FIG. 6), have been in registration for a predetermined interval as measured by the charge on capacitor Q6 in the grid circuit of thyratron gas tube XCC. In the following explanation this tube will be assumed to be not conducting. Assume now that car a has traveled from the sixth landing as described above; that car b is at the second landing in the middle zone and that car c is at the main or lobby landing in the lobby zone. While car b is at the second landing, the middle zone switch MZb (corresponding to MZa FIG. 3, but not shown) is operated over a circuit including contacts MZ2a, MZ2c, coil MZb, selector contact ZSC2b and advancer panel brush ZSBb. This causes actuation of group middle zone relay MGZ over the circuit including contact MZ3b and coil MGZ with the result that contacts MGZ1 and MGZ2 (FIG. 6). in the hall call above and hall call below circuits are separated. This isolates the call above circuit from the lobby zone and the call below circuit from the top zone and prevents a call in the middle zone from calling an additional car into that zone.

Also, the main landing zone switch MLZc (not shown, but corresponding to MLZa) is actuated because the presence of car c at the main landing has brought brush ZSBc into engagement with selector contact ZSC1c. Contacts MLZ3c are closed in the circuit of coil MLGZ of the group main landing relay MLGZ energizing it and opening contacts MLGZ1 and MLGZ2. This opens the call below circuit at two points such that a car in the top zone will not be affected by a landing call below that zone even though no car is in the middle zone provided there is a car at the main landing. Also no car above will be affected by a call at the main landing.

As car $a$ left the top zone its selector brush ZSBa broke engagement with selector contact contact ZSC5a and the circuit for coil TZa of its top zone switch was broken. Its contacts TZ3a in the circuit of coil TGZ are opened and contacts TGZ1 and TGZ2 (FIG. 6) are closed in the hall call above and hall call below circuits. As car $b$ is in the middle zone with its selector brush HHBb in engagement with selector contact HH2b, this car is now made responsive to hall calls in both the top and middle zones.

As car $a$ came to rest at the main landing and contacts LJ3a (FIG. 3) were closed in the circuit of coil LRa (previously described), contacts LR2a in circuit with coil DGa (FIG. 2) were closed. Also, as selector contacts SLS1a are separated coil Ha (FIG. 1) of the field and brake switch is deenergized and contacts H4a (FIG. 2) in circuit with coil RUNa are separated. This closes contacts RUN3a in circuit with coil DGa of direction holding switch DGa and closes contacts DG8a (FIG. 1) to complete the circuit for coil MLUa of main landing up switch MLUa through closed contacts PMY4a, ASR3a, DG8a, and engaged selector contact ZSC1a and advancer panel brush ZSBa. Energization of coil MLUa causes closing of contacts MLU3a which completes a circuit through closed contacts SC3a for the coil GUD of group up dispatching switch GUD. Contacts GUD4 (corresponding to GUD2 for car $a$) in the circuit of coil ASRc are separated. If at this time the MG set of car $c$ is operating, by virtue of the actuation of excitation time switch ETSc, switch ASRc drops out after its hold-in time expires and contacts ASR3c open in the circuit of coil MLUc of main landing up switch MLUc, (not shown, but similar to the circuit for the coil of switch MLUa) deenergizing the coil and causing the switch to drop out. As switch MLUc drops out it opens its contacts MLU2c in the circuit of coil SCc of the selection switch SCc. When switch for car $c$ (not shown, but similar to the circuit for the coil of switch SCa, FIG. 3) drops out elevator $c$ loses its designation as the selected lobby zone car whereupon elevator $a$ wil be assigned as the selected lobby zone car when its switch SCa is operated after energization of its coil SCa through closed contacts MLU2a, ETS4a, SC5b and SC5c. Also, contacts ASR2c (FIG. 1) are closed in the circuit of coil PMc of the pawl magnet for car $c$ to close contacts PM1c and provide a circuit through the brush motor armature BMAc and fields BMFc to cause the brush motor to rotate. As the brush motor rotates, the advancer panel moves in the upward direction to close selector switches SLS1c, etc., and generator field GF is energized to cause car $c$ to move upwardly as a result of having been displaced by car $a$. As the advancer panel moves upward brush ZSBc rides off contact ZSC1c dropping out switch MLZc. Elevator $c$ will continue upwardly until it encounters any "up" hall call; a "down" hall call in a zone to which it becomes assigned, which is also the highest call in that zone or, if there are contiguous unoccupied zones adjacent that zone, is the highest call in those zones; or it encounters an unoccupied zone with no call above it in a contiguous unoccupied zone. In the latter two cases the car's highest call reversal switch HRc will be energized through contacts PMY6c (FIG. 3), RUN1c, HJ3c, DGU1c, coil HRc and one of the circuit branches which includes contacts MZ5c or TZ5c or brush ZRBc and top zone selector contacts ZRC5c etc. and DGU2c. Which of these circuit branches is effective depends upon the simultaneous positions of the cars.

Assume, now, that a sixth landing down hall call is registered as car $c$ starts to run up. The cathode potential of tube 6D is applied to control grid of tube XHJb causing it to conduct. The circuit includes rectifiers DR3 and DR4, contacts TGZ1, the interconnecting lines and rectifiers between the adjacent stationary contacts HHb, contact HH2b, advancer panel brush HHBb and resistor R7b. Upon tube XHJb conducting coil HJXb of higher hall call switch HJXb in the tube plate circuit is energized and closes its contact HJX1b in the circuit of coil HJb (FIG. 3) of higher call switch HJb. This opens contact HJ6b in the circuit of coil ASRb (FIG. 2). When switch ASRb drops out the set coil PMb (FIG. 1) of the pawl magnet PMb is energized through contacts XDO6b, ASR2b and ADV2b causing the advancer panel to be started upward by the brush motor. As the advancer panel moves the selector contacts SLS1b, etc. are closed and the car starts in the up direction to answer the sixth landing down hall call; and is ready to stop for any up hall call which it may encounter. As hereinbefore explained car $c$ is also running up, but it is not responding to the 6D call since separated contacts MGZ1 (FIG. 6) prevents the application of the potential of the cathode of the 6D tube to the control grid of tube XHJc before the advancer panel reaches the second landing floor bar contacts. Upon brush HHBc engaging contact HH2c the 6D call causes switch HJc to be operated in the same manner as switch HJb was operated. When switch HJc operates elevator $c$ is also responsive to the 6D call.

Assume elevator $b$ leaves the middle zone before elevator $c$ and its advancer brush ZSBb leaves contact ZSC4b so that middle zone switch MZb drops out. Contacts MZ2b (not shown, but corresponding to contacts MZ1b, FIG. 3) in the circuit of coil MZc (not shown, but similar to the circuit of coil MZa, FIG. 3) of middle zone switch MZc thereupon closes and prepares the circuit for that coil when brush ZSBc engages a ZSCc contact corresponding to a floor in the middle zone. Car $c$ is now assigned as the middle zone car.

Continued upward travel of elevator $b$ causes brush ZSBb to engage contact ZSC5b completing the circuit for the coil TZb (not shown, but similar to the circuit for coil TZa, FIG. 3) of top zone switch TZb to close contact TZ3b in the circuit for coil TGZ of group top zone relay TGZ. Relay TGZ opens its contact TGZ1 in the interconnecting circuit for the HH contacts below the bottom floor of the top zone. This causes the 6D call to be isolated in the top zone and permits only car $b$, now the top zone car, to respond to it. Car $c$, the middle zone car, can no longer respond to this call since contacts TGZ1 have interrupted the call above circuit and this car is stopped at the next floor it comes to in the middle zone. The stop for car $c$ is initiated by operation of highest call reversal switch HRc caused by energization of its coil HRc through the circuit comprising contacts PMY6c, RUN1c, HJ3c, DGU1c and MZ5c. Contacts HR3c close upon operation of highest call reversal switch HRc and complete the circuit for the reset coil PMc of the pawl magnet. The resetting of the pawl magnet causes the advancer panel to stop its upward travel and initiates the stopping operation in the manner previously explained for car $a$. Car $c$ was not stopped in response to a call and therefore its doors are not opened when it stops. This occurs because switch CPRc is not operated and its contacts CPR2c in switch DOc circuit thereby remain open.

If the stop is made at the highest (fourth) landing in the middle zone, zone top landing switch TLZc is energized to complete a self-holding circuit for highest call reversal switch HRc. This maintains switch HRc operated and contacts HR2c engaged to permit switch DGc to be reset upon car $c$ coming to a stop, prepared for future travel in the down direction. If the stop occurs at any other landing in the middle zone switch DGc remains set for possible future up travel.

Car $b$, in the meantime, continues in the up direction until its stop is initiated when the contacts of advancer panel switch HHSb open as brush HHBb engages stationary contact HH6b. This removes the cathode potential of tube 6D from the control grid of tube XHJ*b* preventing the tube from again conducting and permits higher hall call switch HJX*b* to release. When switch HJX*b* releases, contacts HJX1*b* open in the circuit of coil HJ*b* of higher call switch HJ*b* which closes contacts HJ3*b* in the circuit for coil HR*b* of highest call reversal switch HR*b*. This circuit includes contacts PMY6*b*, RUN1*b*, HJ3*b*, DGU1*b* and TZ5*b*. Contacts HR4*b* open in the circuit of coil HRX*b* of auxiliary highest call reversal switch HRX*b*. Contacts HR3*b* close completing the circuit for the reset coil PM*b* of pawl magnet PM*b*. The pawl magnet upon resetting causes the advancer panel to stop by deenergizing the brush motor armature and fields and by causing the pawls to engage the stopping lug for the sixth landing to hold the advancer panel at that position. With the stopping of the advancer panel elevator *b* is caused to stop at the sixth landing. The 6D hall call is reset in the manner previously described for the resetting of the previous 6D hall call. As the stop took place switch HS*b* was operated by energization of its pull-in coil HS*b* in preparation for the resetting of the 6D hall call. Contacts HS2*b* closed in the circuit of coil CPR*b* (FIG. 2) and call pickup relay CPR*b* operated. Contacts CPR5*b* engaged to complete the self-holding circuit for coil HR*b*. This caused contacts HR2*b* to be maintained in the engaged position until contacts RUN3*b*, and U4*b* closed so that switch DG*b* reset and the direction of future travel reversed. As the stop is completed car *b* opens its doors in the manner as previously described for car *a* to enable the intending passenger at the sixth landing to enter the car.

To demonstrate the operation when a car leaves the zone to which it has been assigned and terminates in an occupied zone other than the main landing zone assume that the entering passenger at the sixth landing registers a third landing car call. The conduction of tube 3C*b* causes tube XLG*b* to conduct and energizes coil LG*b* of lower car call switch LG*b*. Contacts LG1*b* (FIG. 3) engage causing switch LJ*b* to operate opening its contacts LJ4*b* in the circuit of coil ASR*b* of automatic starting switch ASR*b*. When switch ASR*b* times out, the pawl magnet PM*b* is set through the circuit including contacts ASR2*b* and causes the advancer panel to be advanced downward. After the doors close and lock car *b* starts down to the third landing answering all down hall calls it encounters on the way.

As the upper non-conducting portion of cam HCB*b* engages hook switch HCC3*b* the potential of the cathode of tube 3C*b* no longer exists at the control grid of tube XLG*b* and the tube is extinguished in the manner as described for elevator *a*.

The operation of stopping at the third landing and the opening of the doors on elevator *b* takes place in a manner similar to that described for the first landing car call stop for elevator *a*. As the stop occurs relay CPR*b* is operated to close its contacts CPR4*b* when its coil is energized through the circuit including closed contacts XDO1*b* and CBS1*b*. Contacts CPR4*b* complete the self-holding circuit for the coil of LR*b* through advancer panel brush ZRB*b*, stationary contact ZRC3*b*, and closed contacts DGD2*b* and MLGZ5 (not shown, but corresponding to contacts MLGZ3 for car *a*). Contacts MLGZ5 are closed because car *a* is occupying the main landing zone. Switch LR*b* is self-held until car *b* is stopped in order to maintain contacts LR2*b* closed in the set coil circuit of switch DG*b* until contacts RUN3*b* and D4*b* are closed to set the direction holding switch DG*b* for travel to the top zone which is now unoccupied. However, if a car was not located at the main landing such a reversal would not take place since contact MLGZ5 would be open and relay LR*b* would not be operated. This would permit car *b* to continue down to the main landing zone to provide a car for future intending passengers at the main landing.

In somewhat similar fashion an up traveling car entering the occupied middle zone when the top zone is also occupied will have its highest call reversal switch operated until it comes to a stop in order to return it to the unoccupied main landing zone after answering its highest call.

In addition to returning automatically an unassigned car to the unoccupied main landing zone, a main landing hall call causes a car in the adjacent occupied zone to travel down to the unoccupied main landing zone. Breaking contacts MLGZ2 in the lower hall call or LH contact circuit between the first and second landings and breaking contacts MLGZ1 and MGZ2 in the LH contact circuit between the fourth and fifth landings provide a circuit for a main landing hall call to the XLJ tube circuit of a car in the next adjacent occupied zone to cause the car to travel down. This provides a car for intending passengers at the main landing without requiring them to wait for an unassigned car to return to the lower zone. When the main landing zone becomes unoccupied contacts MLGZ4 in the circuit of coil FLC are separated. Coil FLC is deenergized when the charge in its timing circuit is dissipated and contacts FLC1 close to place a call indication through contacts MLGZ2 on contact LH2. This causes a car in the next adjacent occupied zone to come to the main landing, thus providing preferential service for that landing.

From the foregoing description it can be seen that under the intermittent call period conditions, a car entering a zone which does not have a car assigned to it is assigned as the zone car for that zone and prevents any hall call in the zone from calling another car into the zone. A zone car responds to all registered hall calls in its zone. It stops when traveling in the up direction at floors for which its own car calls are registered and at floors for which up landing calls are registered. During downward travel of a zone car in its zone, stops are made in response to its own car calls and to down landing calls. Under circumstances where a hall call in a zone for the opposite direction to that in which the zone car is traveling in that zone is the last hall call in that zone and the zone car is not responding to any call beyond such opposite direction hall call, the zone car also stops for such opposite direction hall call. A zone car stopping at either of the last floors in the zone is set for the only direction in which the car can travel in the zone regardless of the direction in which it had been traveling before stopping. Stops are made in the natural order in which the floors are reached regardless of the order in which the calls are registered. A zone car goes out of its zone in response to a car call registered for a floor out of its zone or for a hall call above its zone in an adjacent unoccupied zone. A zone car will also leave its zone to travel to the unoccupied main landing from the adjacent occupied zone if a main landing hall call is registered or if the main landing zone has been unoccupied for a predetermined period of time.

Upon leaving its zone a car loses its designation or assignment as that zone car and responds to all hall calls for the direction in which it is traveling and any other car call which may be registered. After losing its zone car designation a car entering an occupied zone, which is not the main landing zone, continues to run answering all calls it may encounter for its direction of travel. A car entering the main landing zone causes a car which may be present in the main landing zone with its MG set running to leave the main landing and travel up, as an unassigned car, answering all calls it may encounter for its direction of travel until it reaches an unoccupied zone whereupon it becomes assigned to that zone. If it is not further required to respond to a registered demand for service it parks in its zone. If the excitation time switch ETS of the car selected at the main landing is not actuated, the MG set of that car is shut down and the entry of another car into the main landing zone causes selection to be transferred to it. A selected car at the main landing is caused to leave the main landing when more than a predetermined number of cars are located thereat or upon the registration of a car call or a hall call in an adjacent unoccupied zone.

While the invention has been described as applied to a system having "without attendant" operation, it is applicable to systems arranged only for "with attendant" operation or to systems arranged for "with attendant" and "without attendant" operation. While a three car, seven floor installation has been described, it is to be understood that the invention is applicable to installations having other numbers of cars, and other numbers of floors including one or more basements. With installations having one or more basements, the basement floors may be considered as floors within the main landing zone and thereby serviceable by the main landing zone car. Landing calls to which cars are subject may vary. For example, whereas it has been described that an unassigned car in an occupied zone responds to hall calls in the occupied zone for its direction of travel it may be arranged to have such assigned car non-responsive to such calls.

It is not intended to set forth all the variations that may be made, but it is contemplated that many of the features of the invention disclosed may be carried out in other ways and may be used in connection with apparatus and circuits different from those specifically described and that many apparently widely different embodiments of the invention can be made without departure from the spirit and scope of the invention. It is therefore intended that all matter contained in the above description or shown in the accompanying drawing shall be interpreted as illustrative and not in a limiting sense.

What is claimed is:

1. A control system for a plurality of elevator cars which operate in two directions of travel to serve a building containing a plurality of landings which in said system are segregated into groups establishing a plurality of zones, each including a predetermined number of said landings, comprising; call registering means located in each said car and at each said landing for registering calls for service to and from said landings; starting and stopping means individual to each car, each causing its respective car to start and to stop operating automatically in response to the registration of calls by said call registering means; separate car detection means for each zone, each detection means being actuated in response to the presence of a car in its zone; assignment means operating under predetermined circumstances in response to the actuation of said car detection means and when operated assigning each car to a zone only after it is detected in that zone; and control means operating in response to such assignment of any one of the cars to any one of the zones and arranged to limit the starting and stopping of said one car in response to the registration of landing calls to starting and stopping in response to calls registered only by call registering means in said one zone provided a car is assigned to the zone next adjacent said one zone in a first predetermined direction and another car is located at a landing closer to the terminal landing in the second direction than any landing in said one zone, so that in such circumstances and in the absence of landing calls in said one zone and car calls in said one car the starting and stopping means for said one car stops operating said car at a landing in said one zone.

2. A control system for a plurality of elevator cars which operate to serve a building containing a plurality of landings which in said system are arranged in a plurality of zones, each including a predetermined number of said landings, comprising; call registering means located in each said car and at each said landing for registering calls for service to and from said landings; starting and stopping means individual to each car, each causing its respective car to start and to stop operating automatically in response to the registration of calls by said call registering means; car detection means individual to each zone actuated in response to the presence of a car in its respective zone for detecting that presence; assignment means operated in response to actuation of said car detection means for assigning a car to a zone only after being detected in that zone, and control means responsive to the operation of the car assigning means in assigning any one of the cars to any one of the zones and arranged to prevent the starting and stopping means of a car outside said one zone from starting its respective car in response to the registration of a landing call by said call registering means located at the landings in said one zone and in an empty zone adjacent in a predetermined direction to said one zone.

3. A control system for a plurality of elevator cars operating in two directions of travel to serve a building containing a plurality of landings which in said system are arranged in a plurality of zones, each including a predetermined number of said landings, comprising; call registering means located in each said cars and at each said landing for registering calls for service to and from said landings; starting and stopping means individual to each car, each causing its respective car to start and to stop operating automatically in response to the registration of calls by said call registering means; car detection means operative upon detecting the presence of a car in any of said zones; assignment means operative under predetermined conditions in response to the operation of said car detection means for assigning a car only after being detected in a zone to start and to stop in response to landing calls registered within the zone in which said car is detected; first control means arranged for causing a car so assigned to start in response to the registration of calls by those landing call registering means located only at landings in the zone occupied by said assigned car and in contiguous empty zones one of which is adjacent said occupied zone in a first predetermined direction provided that if any zones extend from said occupied zone in the second direction one of them also has a car assigned to it; and second control means responsive to the occupation of any one of the zones by an assigned car for cooperating with said first control means and preventing the starting and stopping means of a car outside said one zone from starting its respective car in response to the registration of a landing call by said landing call registering means located in said one zone and in contiguous empty zones one of which is adjacent said one zone in said first predetermined direction.

4. A control system for a plurality of elevator cars which operate to serve a plurality of landings, including a main landing, which in said system are arranged in a plurality of zones, each zone including a predetermined number of said landings, comprising; call registering means located at each landing for registering landing calls for service; starting and stopping means individual to each car, each starting and stopping the operation of its respective car automatically in response to the registration of landing calls by said call registering means; assignment means individual to each zone, each assigning to its respective zone a predetermined number of cars only while present in its respective zone; first control means arranged to limit a car assigned to any zone to start in operation in response to the registration of landing calls registered only by said call registering means located at the predetermined number of landings in the zone in which said assigned car is located when the zone next adjacent such zone in a predetermined direction also has a car assigned to it; and second control means responsive to the absence of a car in the zone including said main landing for enabling a car assigned to another zone to start in operation in response to a landing call registered by the call registering means located at said main landing notwithstanding said first control means otherwise would prevent the starting of said car in response to such call.

5. A control system for a plurality of elevator cars operating to serve a plurality of landings which in said system are arranged in a plurality of zones, each zone including a predetermined number of said landings, comprising; call registering means located at each said landing for registering calls for service; starting and stopping means individual to each car, each starting and stopping the operation of its respective car automatically in response to the registration of calls by said call registering means; assignment means individual to each zone, each operating to assign to its respective zone a predetermined number of cars only while present in its respective zone; and control means responsive to the operation of the assignment means associated with any one zone and arranged to enable the starting and stopping means of a car in said one zone to start its respective car in response to the registration of calls by said call registering means located in said one zone and in contiguous empty zones one of which is adjacent said one zone in a predetermined direction as well as to prevent the starting and stopping means of any car outside said one zone from starting its respective car in response to the registration of a landing call by said call registering means located in said one zone and in contiguous empty zones one of which is adjacent said one zone in a predetermined direction.

6. A control system for a plurality of elevator cars operating to serve a plurality of landings which in said system are arranged in a plurality of zones, each zone including a predetermined number of said landings, comprising; call registering means located at each landing for registering calls for service; starting means individual to each car, each starting its respective car in operation automatically in response to the registration of calls by said call registering means; assignment means, individual to each zone, each operating to assign to its respective zone a predetermined number of cars only when present in its respective zone; first control means arranged to enable the starting means of a car in any one of the zones to which a car is assigned to start its respective car only in response to the registration of calls by said call registering means located in said one zone and in a row of contiguous empty zones above and adjoining said one zone; and second control means responsive to the occupation of any one of the zones by its predetermined number of assigned cars for cooperating with said first control means and preventing the starting means of any car above or below said one zone from starting its respective car in responsive to the registration of a landing call by said call registering means located in said one zone and in a row of contiguous empty zones above said adjoining said one zone.

7. A control system for a plurality of elevator cars operating to serve a plurality of landings which in said system are arranged in a plurality of zones, each zone including a predetermined number of said landings, comprising; call registering means located at each landing for registering calls for service; starting and stopping means individual to each car, each causing its respective car to start and to stop operating automatically in response to the registration of calls by said call registering means; assignment means individual to each zone, each operating to assign to its respective zone a predetermined number of cars only after being located in its respective zone, said assignment means terminating the assignment of each said assigned car when it leaves the zone to which it has been assigned; and control means causing a car, the assignment of which has been terminated, to continue operating, regardless of the existence of registered calls, until it is located in and assigned to a zone which thereafter is occupied by no more than the predetermined number of assigned cars for that zone; said control means operating in the absence of registered calls to cause said cars to distribute themselves into the various zones for assignment thereto in which circumstances the starting and stopping means of each assigned car causes its respective car to stop operating at a landing in the zone to which it is assigned.

8. A control system for a plurality of elevator cars operable in two directions of travel and serving a plurality of landings which in said system are arranged in a plurality of zones; including at least one intermediate zone, each zone including a predetermined number of said landings, comprising; call registering means in the cars and at the landings for registering calls for service; starting and stopping means individual to each car, each causing its respective car to start and to stop operating automatically in response to the registration of calls by said call registering means; call cancellation means cancelling calls registered by said call registering means as said cars stop in response thereto; assignment means individual to each zone, each operating to assign to its respective zone a predetermined number of cars only after being located therein, said assigning means terminating the assignment of each said assigned car when it leaves the zone to which it has been assigned; first control means causing a car, the assignment of which has been terminated, to continue to operate, regardless of the existence of registered calls, until it is located in and assigned to a zone which is occupied by no more than the predetermined number of assigned cars for that zone whereupon in the absence of calls said car stops at a landing in the zone to which it is assigned; and second control means, causing a car, the assignment of which has been terminated, and which is located in an intermediate zone occupied by the predetermined number of assigned cars for that zone, to reverse its direction of travel if the last registered call causing it to operate in that direction of travel has been cancelled and all zones located in that direction of travel are occupied by their predetermined number of assigned cars.

9. A control system for a plurality of elevator cars operating to serve a plurality of landings which in said system are arranged in a plurality of zones, each zone including a predetermined number of said landings, comprising; call registering means located in said cars and at said landings for registering calls for service to and from said landings; starting and stopping means individual to each car, each causing its respective car to start and to stop operating automatically in response to the registration of calls by said call registering means; call cancellation means cancelling calls registered by said call registering means as the cars stop in response to said calls; assignment means individual to each zone, each operating to assign to its respective zone a predetermined number of cars located therein, each assignment means including an assignment switch for each car, each switch being energized to assign its respective car to the zone with which the switch is associated in response to the location of the car in the zone when no more than the predetermined number of cars for that zone are located therein, said assignment means for each zone terminating the assignment of any car to its associated zone when said car leaves said associated zone by deenergizing the assignment switch for that car which is associated with that zone; and control means arranged to cause a car all of whose assignment switches are deenergized to continue to operate after the last registered call has then been cancelled until said car is located in a zone which as a result is occupied by no more than the predetermined number of cars for that zone whereupon the starting and stopping means for said car causes the car to stop at a landing in said zone.

10. A control system for a plurality of elevator cars operable to travel to a plurality of landings which in said system are arranged in a plurality of zones including a main landing zone, each of said zones including a number of said landings, comprising; call registering means located at each of said landings for registering calls for service; starting means individual to each car, each causing its respective car to start to operate automatically in response to the registration of calls by said call registering means; assignment means individual to each zone, each operating to assign to its respective zone a predetermined number of cars only when located therein; and control means responsive to the absence of said predetermined number of assigned cars in said main landing zone for (a predetermined period of time causing) actuating the starting means of a car outside said main landing zone to start its respective car in operation and to travel to said main landing zone in response to a landing call registered therein or in response to the absence of said predetermined number of assigned cars for a predetermined period of time.

11. A control system for a plurality of elevator cars operable to travel in two directions to serve a plurality of landings which in said system are arranged in a plurality of zones including a main landing zone comprising; call registering means located at each of said landings for registering calls for service; starting means individual to each car, each causing its respective car to start to operate automatically in response to the registration of calls by said call registering means; assignment means individual to each zone, each operating to assign to its respective zone a predetermined number of cars only when located therein; first control means arranged to prevent cars located in zones in a predetermined direction from said main landing zone from starting in response to calls registered in the main landing zone except in the absence of the predetermined number of assigned cars in the main landing zone; and second control means responsive to the absence of said predetermined number of assigned cars in said main landing zone for actuating the starting means of a car located in the nearest one of the zones located from said main landing zone in said predetermined direction to start its respective car in operation to travel to said main landing zone in response to a landing call registered therein or in response to the absence of said predetermined number of assigned cars for a predetermined period.

12. A control system for a plurality of elevator cars operable to travel in two directions to serve a plurality of landings which in said system are arranged in a plurality of zones including a main landing zone comprising; call registering means located at each of said landings for registering calls for service; starting means individual to each car, each causing its respective car to start to operate automatically in response to the registration of calls by said call registering means; assignment means individual to each zone, each operating to assign to its respective zone a predetermined number of cars only when located therein; first control means arranged to prevent cars located in zones above the main landing zone from starting in response to calls registered in the main landing zone except in the absence of the predetermined number of assigned cars in the main landing zone; and second control means responsive to the absence of said predetermined number of assigned cars in the main landing zone for actuating the starting means of a car located in the nearest one of the zones above said main landing zone to which a car is assigned to start its respective car in operation to travel to said main landing zone in response to a landing call registered therein or in response to the absence of said predetermined number of assigned cars for a predetermined period.

13. A control system for an elevator installation in a building containing both a plurality of landings and a plurality of elevator cars which operate to serve the landings and in which system said landings are segregated into groups to establish a plurality of zones, each including a number of said landings, comprising; call registering means located at each landing for use by passengers to register calls for service; starting and stopping means individual to each car causing its respective car to start and to stop operating automatically in response to the registration of calls by said call registering means; separate car detection means for each zone, each detection means being actuated in response to the presence of a car in its zone; assignment means operating in response to the actuation of said car detection means to assign to each zone a predetermined number of cars only after said cars are detected therein, said assignment means operating to assign any car to any zone in which it is detected when no more than the predetermined number of cars for that zone are detected therein; control means operating in response to the assignment of its predetermined number of cars to any one zone to cause all those cars over and above that number which are detected in said one zone to continue operating regardless of the registration of calls until they become located in and assigned to a zone in which no more than the predetermined number of cars for that zone is detected; said control means operating in the absence of passenger registered calls to cause said cars to distribute themselves into the various zones for assignment thereto in which circumstances the starting and stopping means of each car causes its respective car to stop operating at a landing in the zone to which it is assigned.

14. A control system for an elevator installation in a building containing both a plurality of landings and a plurality of elevator cars which operate to serve the landings and in which system said landings are segregated into groups to establish a plurality of zones, each including a number of said landings, comprising; call registering means located at each landing for use by passengers to register calls for service; starting and stopping means individual to each car causing its respective car to start and to stop operating automatically in response to the registration of calls by said call registering means; separate car detection means for each zone, each detection means being actuated in response to the presence of a car in its zone; assignment means operating in response to the actuation of said car detection means to assign to each zone a predetermined number of cars only after said cars are detected therein, said assignment means operating to assign any car to any zone in which it is detected when no more than the predetermined number of cars for that zone are detected therein, control means operating in response to the assignment of its predetermined number of cars to any one zone to cause all those cars in excess of that number which are detected in said one zone to continue operating regardless of the registration of calls until they become located in and assigned to a zone in which no more than the predetermined number of cars for that zone is detected; said control means including control circuitry and operating in the absence of passenger registered calls to cause said cars to distribute themselves into the various zones for assignment thereto in which circumstances the starting and stopping means of each car causes its respective car to stop operating at a landing in the zone to which it is assigned and after said distribution said control circuitry prevents each assigned car from starting in response to landing calls registered at any landing but one in the zone to which it is assigned.

15. A control system for an elevator installation in a building containing both a plurality of landings and a plurality of elevator cars which operate to serve the landings and in which system said landings are segregated into groups to establish a plurality of zones, each including a number of said landings, comprising; call registering means located at each landing for use by passengers to register calls for service; starting and stopping means individual to each car causing its respective car to start and to stop operating automatically in response to the registration of calls by said call registering means; separate car detection means for each zone, each detection means being actuated in response to the presence of a car in its zone; assignment means operating in response to the actuation of said car detection means to assign to each zone a predetermined number of cars only after said cars are detected therein, said assignment means operating to assign any car to any zone in which it is detected when no more than the predetermined number of cars for that zone are detected therein, control means operating in response to the assignment of its predetermined number of cars to any one zone to cause all those cars in excess of that number which are detected in said one zone to continue operating regardless of the registration of calls until they become located in and assigned to a zone in which no more than the predetermined number of cars for that zone is detected; said control means including control circuitry and operating in the absence of passenger registered calls to cause said cars to distribute themsleves into the various zones for assignment thereto in which circumstances the starting and stopping means of each car causes its respective car to stop operating at a landing in the zone to which it is assigned and after said distribution said control circuitry limits the starting of each assigned car in response to landing calls to those calls registered at prescribed landings so that two cars are prevented from starting in response to one landing call.

16. A control system for an elevator installation in a building containing both a plurality of landings, including a main landing, and a plurality of elevator cars which operate to serve the landings and in which system said landings are segregated into groups to establish a plurality of zones, each including a number of said landings, comprising; call registering means located at each landing for use by passengers to register calls for service; starting and stopping means individual to each car causing its respective car to start and to stop operating automatically in response to the registration of calls by said call registering means; separate car detection means for each zone, each detection means being actuated in response to the presence of a car in its zone; assignment means operating in response to the actuation of said car detection means to assign to each zone a predetermined number of cars only after said cars are detected therein; said assignment means operating to assign any car to any zone in which it is detected when no more than the predetermined number of cars for that zone are detected therein, control means operating in response to the assignment of its predetermined number of cars to any one zone to cause all those cars over and above that number which are detected in said one zone to continue operating regardless of the registration of calls until they become located in and assigned to a zone in which no more than the predetermined number of cars for that zone is detected; said control means operating in the absence of passenger registered calls to cause said cars to distribute themselves into the various zones for assignment thereto in a preferential manner so that at least one car is assigned to the main landing zone in which circumstances the starting and stopping means of each car causes its respective car to stop operating at a landing in the zone to which it is assigned and after said distribution each assigned car is limited in starting in response to landing calls to those calls registered at landings in the one to which it is assigned and in continguous empty zones one of which is adjacent said one zone in a predetermined direction.

17. A control system for a plurality of motor-driven elevator cars according to claim 13, including a main landing zone and in addition, power source means for each said car each having an active and inactive condition, and each supplying power when in said active condition for operating the motor of its respective car; and means responsive to the presence in said main landing zone of more cars than its predetermined number of assigned cars for causing a sufficient number of cars having their power source means in said active condition to leave said main landing zone to reduce the number of cars present in said main landing zone to its predetermined numbers of assigned cars.

18. A control system for a plurality of motor-driven elevator cars operable to travel to serve a plurality of landings which in said system are arranged in a plurality of zones including a main landing zone comprising; call registering means at said landings for registering calls for service; starting means causing said cars to start to operate automatically in response to the registration of calls by said call registering means; assignment means individual to each zone, each operating to assign to its respective zone a predetermined number of cars only when located therein; first control means operating in response to each assignment means and arranged to prevent the starting and stopping means of a car outside the zone with which an operated assignment means is associated from starting its respective car in response to the registration of a landing call by said call registering means located at the landings in said zone and in contiguous empty zones one of which is adjacent in a predetermined direction to said zone, power source means for each said car, each having an active and an inactive condition, each supplying power when in said active condition for operating the motor of its respective car; and second control means responsive to the entrance of a car into said main landing zone when occupied by its predetermined number of assigned cars for causing an assigned car with its power source in said active condition to start automatically and leave the main landing zone.

19. A control system for a plurality of motor-driven elevator cars operable to travel to serve a plurality of landings which in said system are arranged in a plurality of zones including a main landing zone comprising; call registering means in each car and at each landing for registering calls for service; starting means causing said cars to start to operate automatically in response to the registration of calls by said call registering means; assignment means individual to each car, each operating to assign to its respective zone a predetermined number of cars only when located therein; first control means operating in response to the operation of each assignment means to limit the starting of any car in response to the registration of landing calls to those landing calls registered in the zone in which the car is located; power source means for each said car, each having an active an inactive condition, each supplying power when in said active condition for operating the motor of its respective car; and second control means responsive to the entrance of a car into the main landing zone occupied by its predetermined number of assigned cars all having their power source means in the inactive condition for causing said entering car to start automatically and leave said main landing zone.

20. A control system for a plurality of motor-driven elevator cars according to claim 14, including a main landing zone and in addition, power source means for each said car, each having an active and an inactive condition, each supplying power when in said active condition for operating (each said) the motor of its respective car; means responsive to an assigned car located in the main landing zone with its power source in said active condition for selecting said car as the next assigned car to start to operate from the main landing zone; and means responsive to the entrance of a car into the main landing zone when already occupied by its predetermined number of assigned cars one of which is said selected car for causing said selected car to start automatically and leave said main landing zone.

21. A control system for a plurality of motor-driven elevator cars according to claim 15, including a main landing zone and in addition, power source means for each said car, each having an active and an inactive condition, each supplying power when in said active condition for operating the motor of its respective car; means responsive to the power source of all assigned cars located in the main landing zone being in said inactive condition for selecting one of said assigned cars as the next car to start to operate automatically from said main landing zone; and means responsive to the entrance of a car with its power source in said active condition into the main landing zone for causing the selection to be switched to said entering car.

22. A control system for a plurality of motor-driven elevator cars according to claim 16, including, power source means for each said car, each having an active and an inactive condition, each supplying power when in said active condition for operating its respective car; means responsive to the power source of all assigned cars located in the main landing zone being in said inactive condition for selecting one of said assigned cars as the next car to travel from said main landing zone; and means responsive to the entrance of a car with its power source in said active condition into said main landing zone when already occupied by its predetermined number of assigned cars for causing said entering car to start automatically and leave said main landing zone.

References Cited

UNITED STATES PATENTS 2,597,586   5/1952   Keiper et al.     187—29
2,642,158   6/1953   Eames     187—29

ORIS L. RADER, *Primary Examiner.*

THOMAS LYNCH, *Examiner.*